US006642991B2

(12) United States Patent
Krum et al.

(10) Patent No.: US 6,642,991 B2
(45) Date of Patent: *Nov. 4, 2003

(54) METHOD OF UTILIZING ABSORBING MEANS IN COUPLING SUBSTRATE

(75) Inventors: David D. Krum, Corrales, NM (US); Robert B. Hogue, Albuquerque, NM (US); Brian R. Panuska, Phoenix, AZ (US)

(73) Assignee: Honeywell International Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/429,989

(22) Filed: Oct. 29, 1999

(65) Prior Publication Data

US 2003/0071954 A1 Apr. 17, 2003

Related U.S. Application Data

(63) Continuation-in-part of application No. 09/410,888, filed on Sep. 30, 1999.

(51) Int. Cl.[7] ............................................. G02F 1/1337
(52) U.S. Cl. ...................... 349/190; 349/153; 349/189
(58) Field of Search ................................. 349/189, 190, 349/96, 153, 123

(56) References Cited

U.S. PATENT DOCUMENTS 4,023,259 A * 5/1977 Kubota et al. .............. 29/592.1

| | | | |
|---|---|---|---|
| 4,299,639 A | 11/1981 | Bayer | 156/104 |
| 4,387,133 A | 6/1983 | Ichikawa et al. | 428/215 |

(List continued on next page.)

FOREIGN PATENT DOCUMENTS

| | | | |
|---|---|---|---|
| DE | 3127347 A1 | 7/1981 | G02F/1/133 |
| EP | 0 187 425 A1 | 1/1985 | G02F/1/133 |
| JP | 02284116 | 4/1989 | G02F/1/1333 |
| JP | 07-211455 | * 8/1995 | |

OTHER PUBLICATIONS

New Product Information, Dow Corning Corporation, Q3–6575 Silicone Dielectric Gel, 1984.

(List continued on next page.)

Primary Examiner—Kenneth Parker
Assistant Examiner—David Y. Chung (57) ABSTRACT

A method for using absorbing means for optically coupling substrates together to significantly decrease or eliminate water or like liquid buildup or condensation between the coupled substrates. Two clean substrates are initially provided. A means for absorbing, such a polyvinyl alcohol film, is applied to a first substrate surface. The substrates are then bonded together so that the first substrate surface is in facing relation to the second substrate, and then positioned parallel to each other and in close proximity to each other. A clear means for optically coupling is then de-gassed to remove any gas within the means for optically coupling. Then, a pressurized means for injecting is filled with the means for optically coupling. The means for injecting then introduces the means for optically coupling within the two substrates from a peripheral edge, thereby allowing the means for optically coupling to permeate throughout the volume between the two substrates. The means for optically coupling is allowed to cure, thereby adhering the substrates together.

15 Claims, 10 Drawing Sheets

U.S. PATENT DOCUMENTS

| | | | |
|---|---|---|---|
| 4,640,583 A | * 2/1987 | Hoshikawa et al. | 349/153 |
| 4,715,686 A | 12/1987 | Iwashita et al. | 350/339 R |
| 5,087,985 A | * 2/1992 | Kitaura et al. | 359/350 |
| 5,177,629 A | * 1/1993 | Bohannon | 349/74 |
| 5,417,257 A | 5/1995 | Shimamune et al. | |
| 5,468,064 A | * 11/1995 | Lengyel et al. | 349/96 |
| 5,479,284 A | 12/1995 | Watanabe et al. | |
| 5,511,591 A | 4/1996 | Abe | |
| 5,548,429 A | * 8/1996 | Tsujita | 349/187 |
| 5,703,666 A | * 12/1997 | Saika et al. | 349/61 |
| 5,725,032 A | 3/1998 | Oshima et al. | |
| 5,729,250 A | 3/1998 | Bishop et al. | |
| 5,742,372 A | 4/1998 | Furukawa | |
| 5,751,392 A | 5/1998 | Shimotoyodome et al. | |
| 5,818,556 A | 10/1998 | Havens et al. | |
| 5,818,563 A | 10/1998 | Colgan et al. | |
| 5,828,435 A | 10/1998 | Kato et al. | |
| 5,844,639 A | 12/1998 | Togawa | |
| 5,847,782 A | 12/1998 | Imazeki et al. | |
| 5,877,828 A | 3/1999 | Tanaka et al. | |
| 5,986,730 A | * 11/1999 | Hansen et al. | 349/96 |
| 6,001,203 A | * 12/1999 | Yamada et al. | 156/106 |
| 6,151,097 A | * 11/2000 | Matuzawa | 349/190 |
| 6,288,764 B1 | * 9/2001 | Zhang et al. | 349/152 |
| 6,288,766 B1 | * 9/2001 | Mashiko et al. | 349/189 |

OTHER PUBLICATIONS

New Product Information, Nye lubricants, Fiber Optic Optical Coupling Kit.

* cited by examiner

METHOD OF UTILIZING ABSORBING MEANS IN COUPLING SUBSTRATE

This invention is a continuation-in-part of U.S. patent application Ser. No. 09/410,888 titled "Method for Coupling Substrates," filed Sep. 30, 1999.

FIELD OF THE INVENTION

The present invention relates to the field of substrates, and more particularly, to the field of using absorbing materials in substrates, the substrates being coupled together by a means for cohering or like means for cohesively laminating so as to significantly decrease or eliminate water or like liquid buildup or condensation between the coupled substrates.

BACKGROUND OF THE INVENTION

Liquid crystal display (LCD) devices are well known in the art and are useful for many applications in numerous industries (such as, for example, the avionics, consumer goods and the computer industries). Several types of LCD substrates are in production. The manufacture of LCD substrates typically require capturing a thin layer of liquid crystal between two pieces of transparent substrates, such as glass or plastic, forming a liquid crystal cell. When an electric field is applied, the field alters the molecular alignment of the liquid crystal, thus affecting the light that is passed through the crystal. This phenomena turns small windows of light known as pixels (picture elements) "on" and "off." LCD displays are usually light-weight, require low power and provide precise viewing resolution. Further, LCD displays are now manufactured as rigid substrates or flexible substrates.

The liquid crystal must be in a particular orientation, or oriented in the correct direction, to operate properly. The orientation of the liquid crystal is achieved in the manufacturing process by rubbing the two plates with a polymer, creating parallel furrows. The most common type of LCD on the market today is a passive form in which all the pixels in each row are tied together, thus reducing the need to control each pixel independently. But, that means the pixels remain in a state between on and off, resulting in a loss of contrast. It also produces annoying ghost images, especially of moving objects, in either the rigid substrate or the flexible substrate form.

Researchers have been struggling for years to develop cost-efficient active displays in which each pixel is controlled by its own transistor. Active matrix displays are now available on laptops, but they are expensive to manufacture, partly because the transistors can be so easily damaged during the fabrication of the display screen. Some technologies not currently on the market could potentially reduce the cost, including ferroelectric liquid crystal cells (in which a thin film transistors would be used to control the pixels individually). In a ferroelectric screen, each pixel would be either on or off, thus producing an image that is light and dark, like the numbers on a digital watch.

Fabrication of LCD displays has proven extremely difficult, often resulting in low yields and thus, higher costs. When the polymer is rubbed across the film of transistors to provide alignment for the liquid crystal, it may cause mechanical damage and electrostatic charges that can potentially damage the transistors. The yield of the transistors then decreases drastically, which affects the price of the finished LCD display substrate. And, because of the sensitivity of such screens, the screens must be protected, usually by adhering another substrate (such as a glass cover of equivalent dimensions) to the LCD substrate. Moreover, another advantage of employing another substrate is that it increases optical performance. An optical coating (such as an anti-reflective coating) may also optionally be coated on to the substrate which is coupled or otherwise adhered to the LCD display.

One method of adhering a protective substrate to the LCD cell (active and passive plate combination) is known as the "gravity pour" method. In this method, a clean LCD cell is placed immediately adjacent to a clean protective substrate at a 90 degree vertical angle so that the LCD substrate and the protective substrate are parallel to each other and in close proximity to each other. Bond tape (such as VHB high bond tape manufactured by Minnesota Mining and Manufacturing), similar to double-sided tape, is then applied to the periphery edges of the LCD substrate (typically within 0.060 inches from the outer periphery). The LCD substrate with cover glass attached is preferably oriented at approximately 90 degrees from horizontal. Then, the two substrates are precisely brought together so that the bond tape provides a seal between the periphery edges of the two substrates. In this construct, an air gap or air cell is created between the two substrates of known width (usually 0.025 inches to 0.045 inches apart, which are the typical commercial widths available for bond tape). Then, silicone or another like optical coupling material is poured between the two substrates along an opening in the top edge of the tape-bonded substrates and allowed to slowly permeate between the substrates by gravitational forces. Another opening (usually also located at the top edge) is also required to allow the air volume to escape from the air gap as the pour process continues. This gravitational pour process usually takes more than an hour and may or may not be successful in completely filling the entire air gap between the bonded substrates. The viscous fluid typically employed has a characteristic viscosity of about 150 cps, but can go as high as 4500 cps.

The problems associated with using the pour prior art adhesion process, however, are numerous. First, adhesive optical materials bond the substrates together to form an almost permanent, rigid planar beam. And, for example, filling all the air cell space between the two substrates is difficult due to the viscosity of the adhesion fluid which often leads to visible air volume space or air bubble formation between the substrates. Further, this process is slow, which means that unless the timing is precise for the complete permeation of the air gap with fluid, those optical fluids which undergo a chemical cure will do so before the substrate adhesion process is complete (since most viscous fluid pot life is in the range of 15 minutes to 1 hour). Thus, if the fluid cures too quickly before the gravity pour process is complete, it may require repeated pour processes, unusable substrates, partially bonded substrates or damaged substrates. The position of the substrates at 90 degrees also introduces substantial friction between the two substrates, which reduces the even flow of viscous fluid between the substrates during the injection process. And, because the gravity pour method results in inconsistent permeation, the final substrate does not always possess uniformity of throughout the substrate. Moreover, other manufacturers in the art have used fluids or UV cured adhesives or optical epoxies to optically couple substrates, however the gap between the substrates is very small as to transmit the axial deflection directly to the LCD substrate, which causes optical distortions which can persist. Finally, if the gravity pour process is not executed precisely under careful conditions, the two substrates, after bonding, sometimes exhibit a bowl shape in the middle of the substrates due to increased hydrostatic pressure, leading to an unusable LCD substrate.

U.S. patent application Ser. No. 09/410,888 commonly-owned by the assignee of the present invention, discloses a novel method for optically coupling substrates together. The two substrates are then sealed adjacent to each other by a means for sealing. A means for optically coupling (such as an optically clear fluid) is then de-gassed to remove any dissolved or remaining gas within the means. Then, a pressurized means for injecting (such as a pressurized syringe) is filled with the de-gassed means for optically coupling, while a means for exhausting the means for optically coupling is provided through the means for bonding along a top edge of the bonded substrates. The method requires providing two clean substrates and positioning each at approximately a 20 degree angle (or an incline of various ranges) parallel to each other and in close proximity to each other. The pressurized means for injecting then introduces, through the means for sealing, the means for optically coupling between the two substrates from a side peripheral edge. The means for optically coupling is subsequently allowed to permeate throughout the entire air cell area, and then, cured or allowed to cure. One advantage of this method is that it allows for higher yields of coupled substrates. And, due to the gel-like characteristics of the means for optical laminating employed, improperly injected coupled substrates can be taken apart and remanufactured according to the method disclosed. Without such a method, damaged coupled substrates were usually discarded even if the LCD substrate was in good operating condition because the prior art optical lamination would cure to a hard adhesive consistency.

While U.S. patent application Ser. No. 09/410,888 discloses a novel method for coupling substrates together by the injection of a degassed means for optically coupling, it has been discovered that under certain temperature ranges and environmental conditions, small water (or other liquid) droplets have the capability to permeate the means for sealing (such as, for example, the RTV seal surrounding the substrate edge) and thus, be introduced into the means for optically coupling resulting in a condensation-like appearance of the bonded substrate. While the cause of this condensation-like phenomena is not clear, it has been suggested that a preferred means for optically coupling (e.g. Q3-6575 manufactured by Dow Corning or like dielectric material) is hydrophobic, meaning that it does not absorb liquid (such as, for example, water), but will allow the liquid to transmit through the means for optically coupling if present in sufficient quantities (such as, for example, during high humidity conditions). If this occurs, the view of the coupled substrate appears hazy due to the small liquid droplets which have permeated portions of the means for optically coupling. The water droplets also result in significantly increased diffuse reflectance. This phenomena is exhibited, for example, when two glass substrates are subjected to the method of application Ser. No. 09/410,888. During the humidity test of this method, it was discovered that subjecting clean glass plates (i.e., glass plates without any absorbing material, polarizer or like material applied to either substrate) to this method resulted in the hazy view, despite efforts to remove the haze with conventional cleaning solutions. This result was unexpected because products manufactured by the method disclosed in application Ser. No. 09/410,888 never exhibited this phenomena. However, these products had not been tested under various temperature ranges and environmental conditions. Detailed inspection of the test substrates revealed small portions of liquid permeated through the edge seal gasket of the air cell into the coupling material. What is thus required is a method of using absorbing material or a like means for absorbing in the coupling substrate process to significantly decrease or eliminate liquid buildup between the coupled substrates.

Those of skill in the art recognize that polarizers and polarizing films are designed to transmit light waves along one axis and absorb them on another. Polarizers are applied on each side of every LCD substrate. The axes of the polarizers are crossed at 90 degrees, so that the light absorbing and light transmitting axes are oriented at 90 degrees to each other. Standing alone, polarizers crossed in this manner do not allow light to pass. However, in the power off state, the liquid crystal cells in the LCD panel between the crossed polarizers rotate light passing through them 90 degrees, defeating the effect of the crossed polarizers and causing the display to appear transparent. When the surface of an individual liquid crystal cell in the LCD panel is electrically charged or activated, the cell ceases to rotate the polarized light and the segment appears as a dark spot on the screen. By electronically controlling the activation state of the individual cells in the LCD panel, information can be displayed.

Polarizing films for LCD applications are usually constructed of a stretched film of polyvinyl alcohol (PVA) which is then soaked with an iodine solution. The iodine diffuses into the PVA and forms a complex compound within the coils of the long chains of the host. As a result of the dichroic nature of iodine, the material absorbs most of the visible light polarized parallel to the length of the chains but transmits the light polarized perpendicular to the chains.

In general, materials used to construct absorbing or polarizing films such as PVA film characteristically absorb liquid such as water, however, excessive amounts of moisture absorption can be detrimental to the performance of the polarizer because the iodine may leach out of the material. Testing has shown that if the edges of the polarizer are properly sealed, polarizer films are able to absorb small amounts of moisture without a reduction in performance. This moisture absorption is adequate to eliminate the development of condensation within optical coupling gels.

BRIEF SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

The present invention is a method of using films, polarizers, means for absorbing or like absorptive materials in coupling substrates together. The method requires providing two clean substrates, applying a means for absorbing to at least one of the substrates' surface which will face the other substrate, and positioning each substrate parallel to each other and in close proximity to each other. The two substrates are then sealed adjacent to each other by a means for sealing, with the means for absorbing located therebetween. A means for optically coupling (such as an optically clear gel) is then de-gassed to remove any dissolved or remaining gas within the means. Then, a pressurized means for injecting (such as a pressurized syringe) is filled with the de-gassed optical laminate means, while a means for exhausting the optical laminate means is provided through the means for bonding along a top edge of the bonded substrates. The pressurized means for injecting then introduces, through the means for sealing, the means for optical laminating between the two substrates from a side peripheral edge. The means for optically coupling is subsequently allowed to permeate throughout the entire air cell area, and then, cured or allowed to cure. By employing the means for absorbing within the coupled substrates, liquid introduction into the means for optically coupling, and thus the air cell, is significantly decreased or eliminated.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

As seen in FIGS. 1–7, the present invention is a method of using films, polarizers, means for absorbing or like absorbing means or materials in coupling substrates together by a means for optically coupling so that liquid introduction into the optically coupling laminate, is significantly decreased or eliminated, and a product produced by this method.

Although the present invention finds application in many areas, the following description is provided with respect to a lamination for LCDs for ease in introducing the invention only. The following discussion contemplates attaching a means for absorbing, such as a polyvinyl alcohol film or similar polarizing film, to a commercially available LCD substrate and then placing a protective substrate (such as glass, an anti-reflective or indium-tin oxide (ITO) substrate, for example) between the viewer of the LCD and the LCD.

Figure 1:
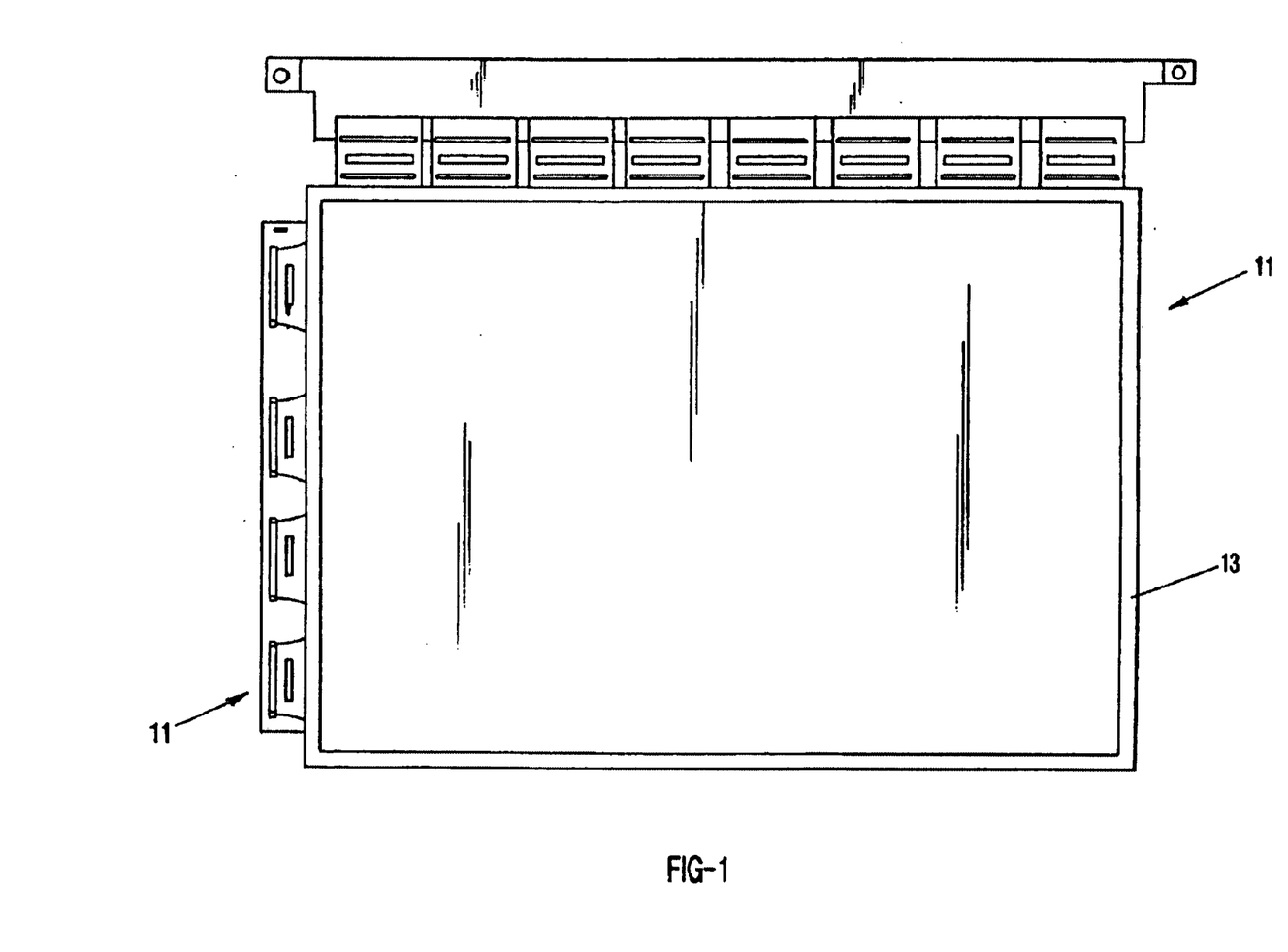
FIG. 1 is a top plan view illustrating a LCD substrate without any hardware frame.

Most commercially available LCD units are delivered in an electronic frame hardware for ease of installation into existing electronic systems. In a preferred embodiment of the present invention, as seen in FIG. 1, the LCD substrate 11 should be removed from the hardware frame (including all electrical connectors attached to the frame). Those of skill in the art will discover, however, that removal is not necessary in all applications.

When the LCD substrate 11 is removed from the hardware frame as shown in FIG. 1, the substrate 11 can then be placed into a holding bracket or otherwise held (not shown). Those of skill in the art will realize that a variety of holding brackets, capable of securely retaining the LCD substrate 11 and the protective substrate 21 at a predefined angle from horizontal, are available or could be designed and manufactured to accommodate the present invention (including the use of one's own hands).

The LCD substrate requires attaching a means for absorbing 41 to an interior surface 11a which will be in facing relationship with secondary substrate 21. In a preferred embodiment of the present invention, the means for absorbing is a polyvinyl alcohol film, but similar polarizer films, absorbing materials or like sheets can be applied to the LCD substrate surface 11a. Both the LCD substrate 11 and the protective substrate 21 can then be cleaned with optical cleanser or soap, such as for example, liquinox, and rinsed with de-ionized water in a conventional manner. Both substrates 11, 21 can then be dried by a pressurized air blower or the like to achieve optimum cleansing.

Figure 2:
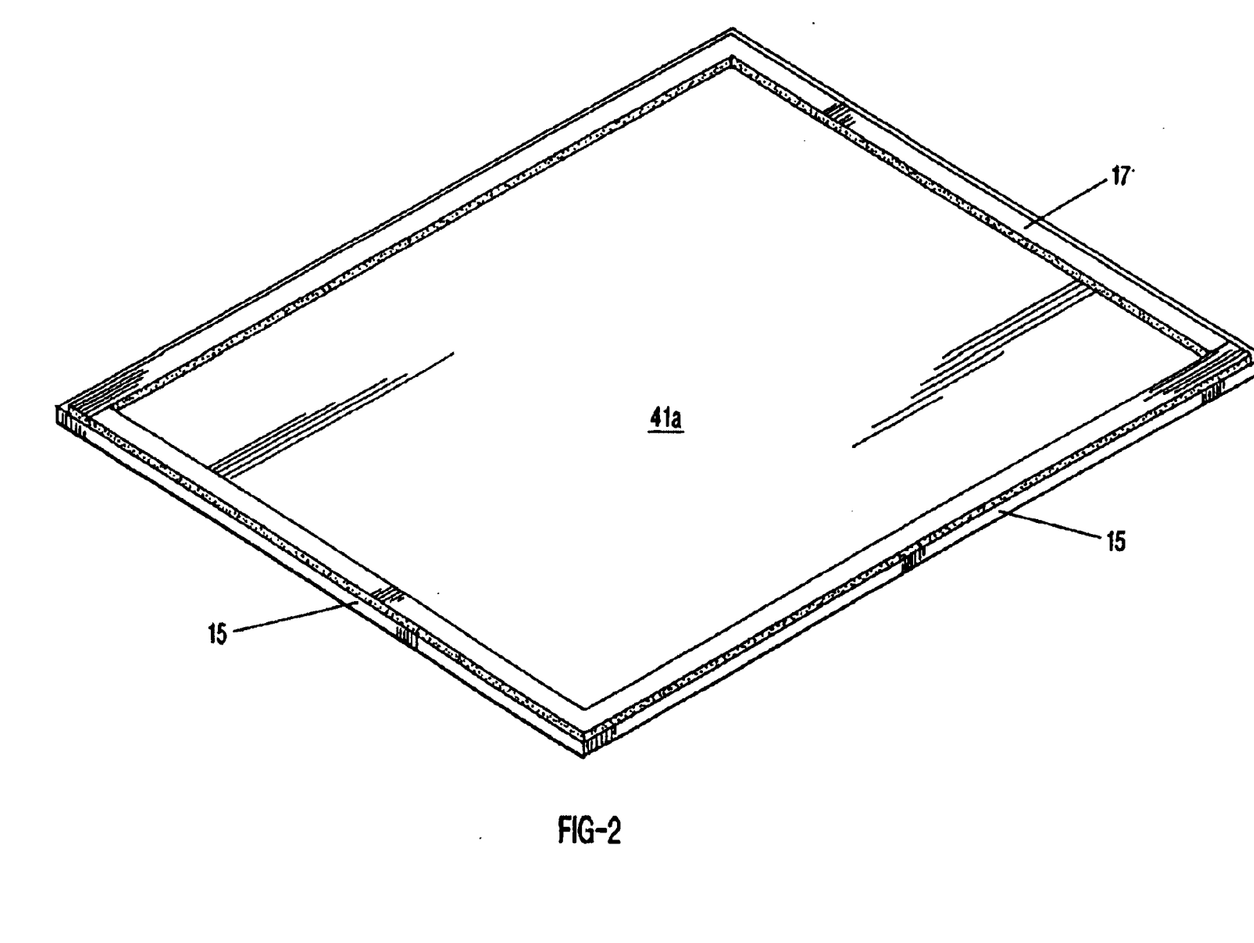
FIG. 2 is a side perspective view of the present invention LCD substrate illustrating the LCD substrate on the bottom, an absorbing means applied to one surface of the LCD substrate and the bond tape applied to the outer periphery of the LCD substrate, in accordance with the present invention.
Figure 3:
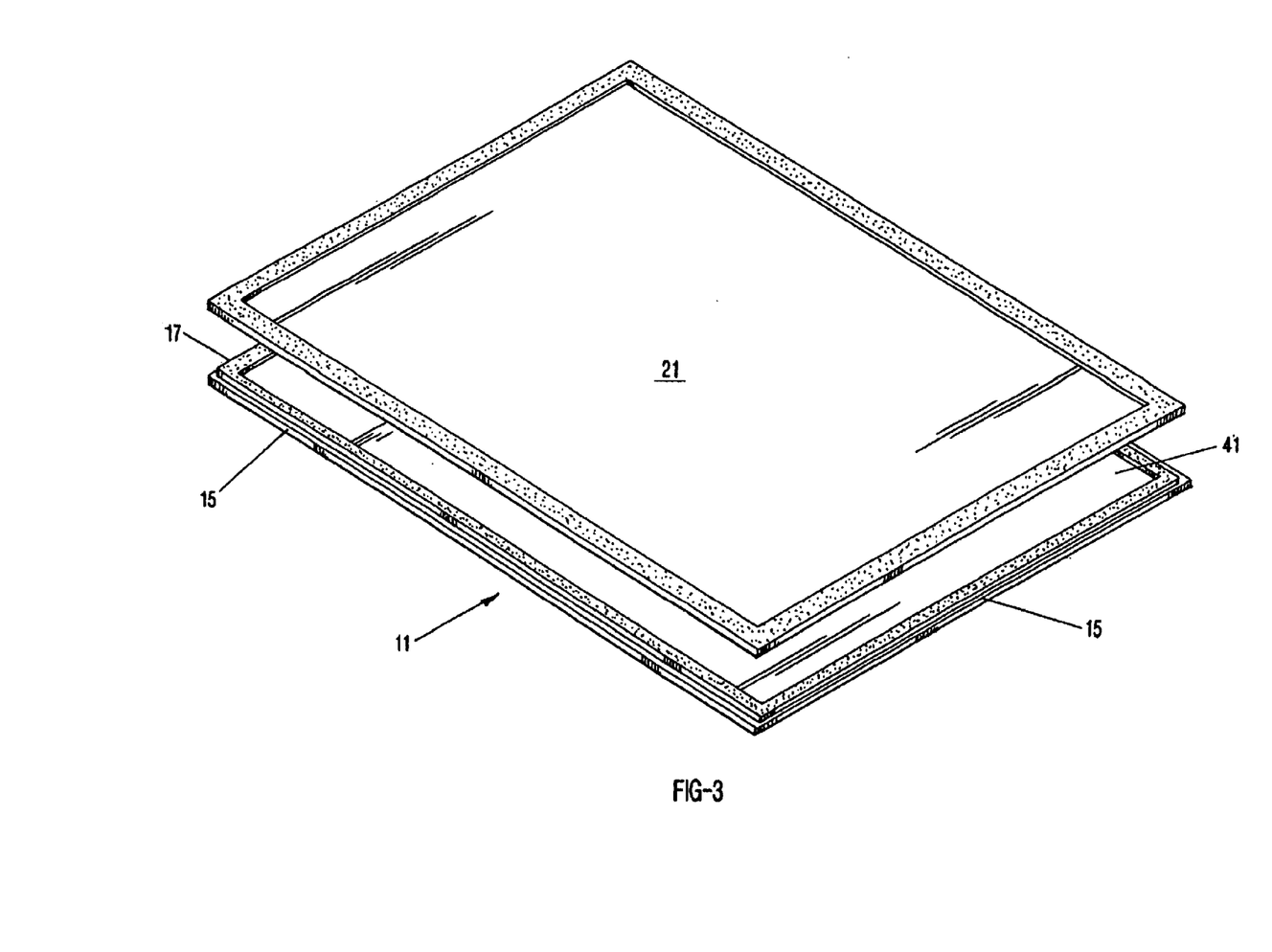
FIG. 3 is an exploded side perspective view of the present invention illustrating the LCD substrate on bottom, the bond tape applied to the outer periphery of the LCD substrate, the absorbing means placed upon the LCD substrate facing the protective substrate, with the protective substrate on the top positioned to be bonded to the LCD substrate, in accordance with the present invention.

Almost all LCD substrates 11 have a continuous black matrix 13 layer inherently formed and near the LCD substrate's peripheral edges 15. Referring to FIG. 2, there is shown a perspective view of an LCD substrate 11 with bond tape 17 applied to its peripheral edges 15. In one preferred embodiment of the present invention, a means for absorbing 41 is first applied to a first surface 11a of the LCD substrate. Then, a means for bonding 17 (such as a gasket or a strip of VHB bond tape manufactured by Minnesota Mining and Manufacturing) is applied atop the means for absorbing 41, using the black matrix 13 as a guide. Those of skill in the art will come to realize that other means for bonding 17 are available for application in the present invention. For example, instead of applying bond tape of a predetermined, known thickness, an application of a thin strip of an RTV seal (such as RTV 732 manufactured by Dow Corning) could be used, which beneficially allows the two substrates to be bonded in closer relationship and also provides a smaller air gap 19 space between the substrates 11,21. Experiments have shown that the width X of the air gap 19 (as seen in FIG. 5) when using RTV 732 can be as small as 0.015 inches, although it is contemplated that the air gap 19 can be increased or decreased depending on the application, available materials and means for injecting.

Figure 7:
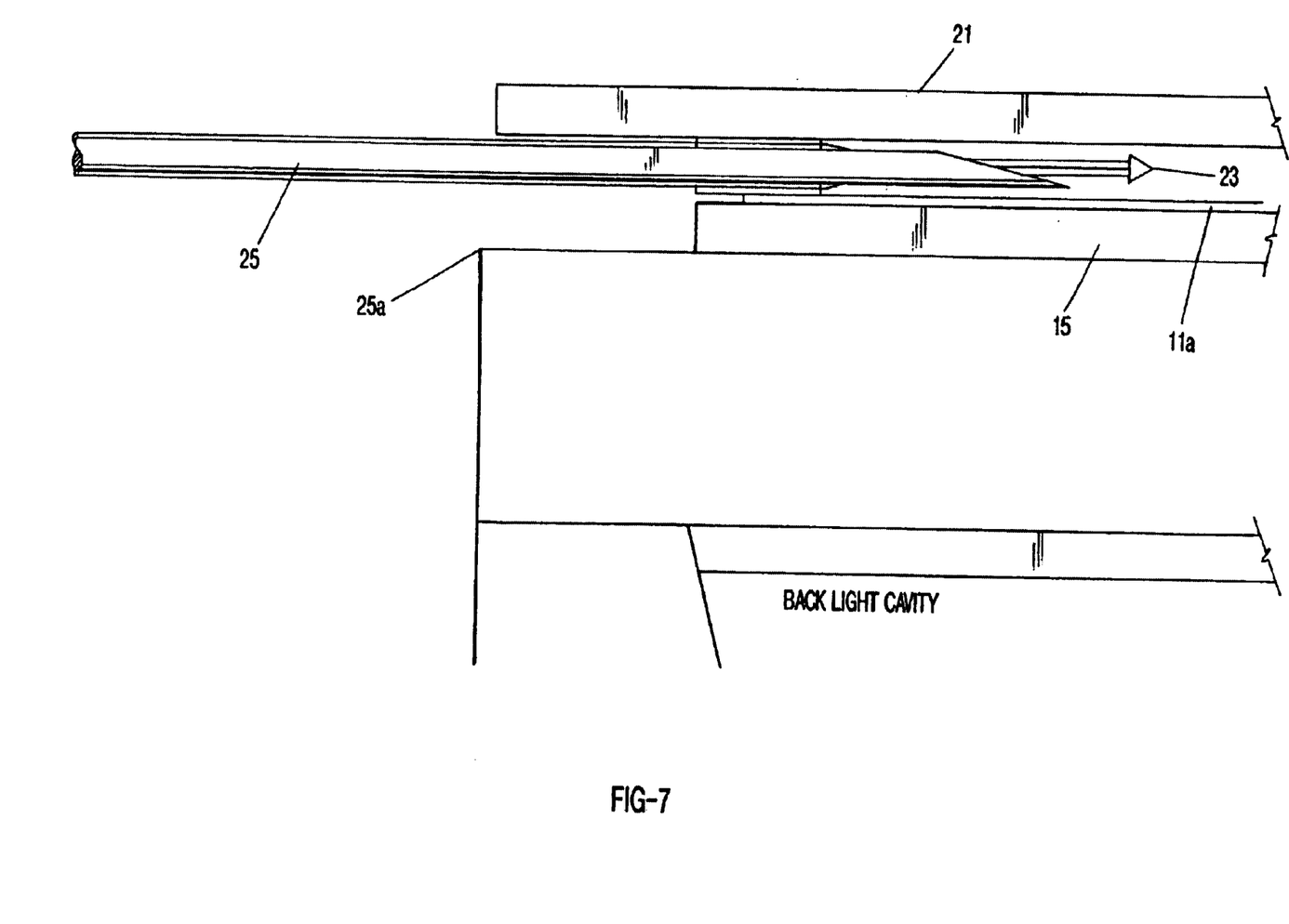
FIG. 7 is a partial side plan view of the present invention, illustrating a means for injecting dispensing a means for cohering into the bonded substrate.

Next, the protective substrate 21 is placed adjacent to and in alignment with the LCD substrate's first surface 11*a* (farthest away from the backlight, as seen in FIG. 7, and in facing relationship towards protective substrate 21) or farthest away from the edge light or light source employed. Protective substrate 21 has optical clarity, transmissability over the visual wavelengths, has a refractive index as close to approximately 1.41 (a unitless number known to those of skill in the art, since refractive index is a ratio of speed of light in air to the speed of light in the glass), materially and optically compatible with polarizers, glass and other materials that are found on LCD's and can sustain a temperature range of approximately −55 degrees Celsius to 110 degrees Celsius to avoid material characteristic changes. The protective substrate 21 is then seated upon the means for bonding 17, and in conventional fashion, allowed to bond to the LCD substrate 11 via the means for bonding 17 (taking into account adequate cure time). Those of skill in the art will realize that while VHB bond tape is currently commercially available in many sizes, for example 0.015", 0.025", 0.045", 0.062", 0.080", 0.120", etc., any suitable means for bonding can be used and still be within the spirit and scope of the present invention. Further, those of skill in the art will realize that the exact material employed as the means for bonding 17 is not critical, but does require that the material be able to bond substrates 11,21 together and be permeable enough to allow penetration of certain devices (such as syringe needles, catheters or like devices) in accordance with the present invention.

Ideally, when the two substrates 11, 21 are then aligned in close proximity, bonded together by the means for bonding 17 and placed in a hardware frame, that the means for bonding 17 (such as an airline pilot or computer monitor user). The bond tape 17 should provide a continuous path along the LCD substrate's outer periphery 15 so that can not escape when the two substrates 11, 21 are coupled together. It is helpful to apply minimal pressure to the means for bonding 17 to ensure good cohesion between the surface 11*a* of the LCD substrate 11 and the means for bonding 17.

Figure 5:
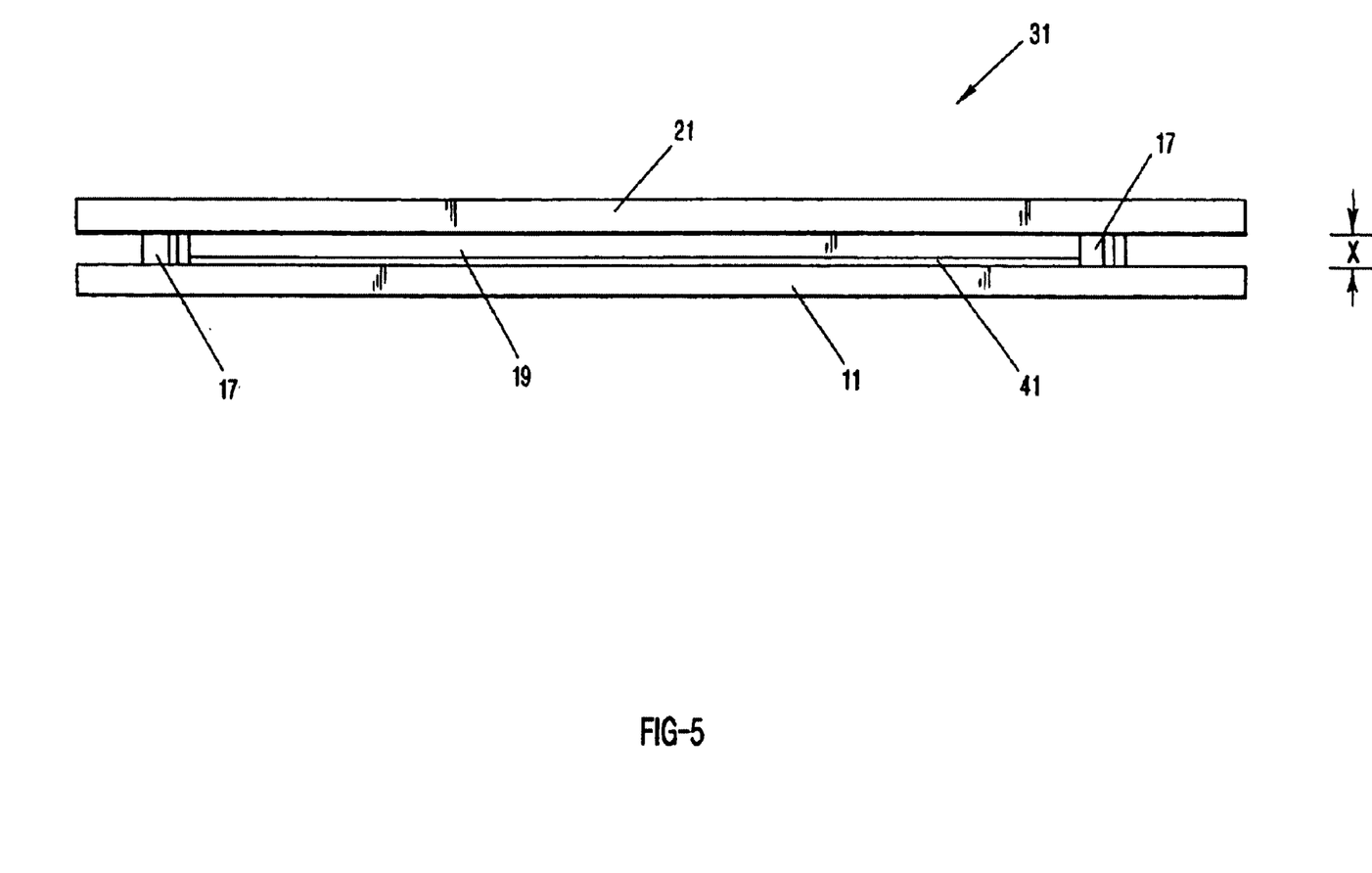
FIG. 5 is a side cross-sectional view taken along lines A—A shown FIG. 4, illustrating the means for absorbing as defined in the present invention.

Once the LCD substrate 11 and the protective substrate 21 are bonded together, they form a bonded substrate 31 as shown in FIGS. 2 and 5. An air gap 19 (or, air cell) is thus created within the area bounded by the means for bonding 17 along the substrates' 11, 21 peripheries, the interior surface of one substrate 21*a* and an exterior surface of the means for absorbing 41 furthest away from substrate surface 11*a*. The air gap is designed to retain a means for optically coupling 23 and provide a supporting structure while preventing liquid buildup on either substrate surface or the exterior surface of the means for absorbing 41, or, within the means for optically coupling 23. The protective substrate 21 thereby permits volumetric thermal expansion and contraction while leaving the LCD substrate 11 relatively unaffected during stress or strain conditions. The means for absorbing 41, in turn, assists in significantly decreasing or completely eliminating any unwanted liquid formation or buildup within air cell 19 during various temperature ranges or environmental conditions.

Optionally, after the two substrates 11, 21 are bonded together the bonded substrate 31 is placed on a substrate holder (not shown) and adjusted so that the bonded substrate's 31 surface plane is placed at an incline or angle. The process can be adapted as will be recognized by those skilled in the art to result in a hermetic seal between substrates 11 and 21. Preferably, the angle is at a relatively small angle from horizontal, such as approximately 20 degrees from horizontal. While it is believed that approximately 20 degrees from horizontal is an optimum angle for injection of a means for optically coupling 23 into the air gap 19, an equivalent angle could range from 10 degrees to 70 degrees from horizontal (or, some increment therebetween). Those skilled in the art will discover that other angles will work depending on the application.

Figure 4:
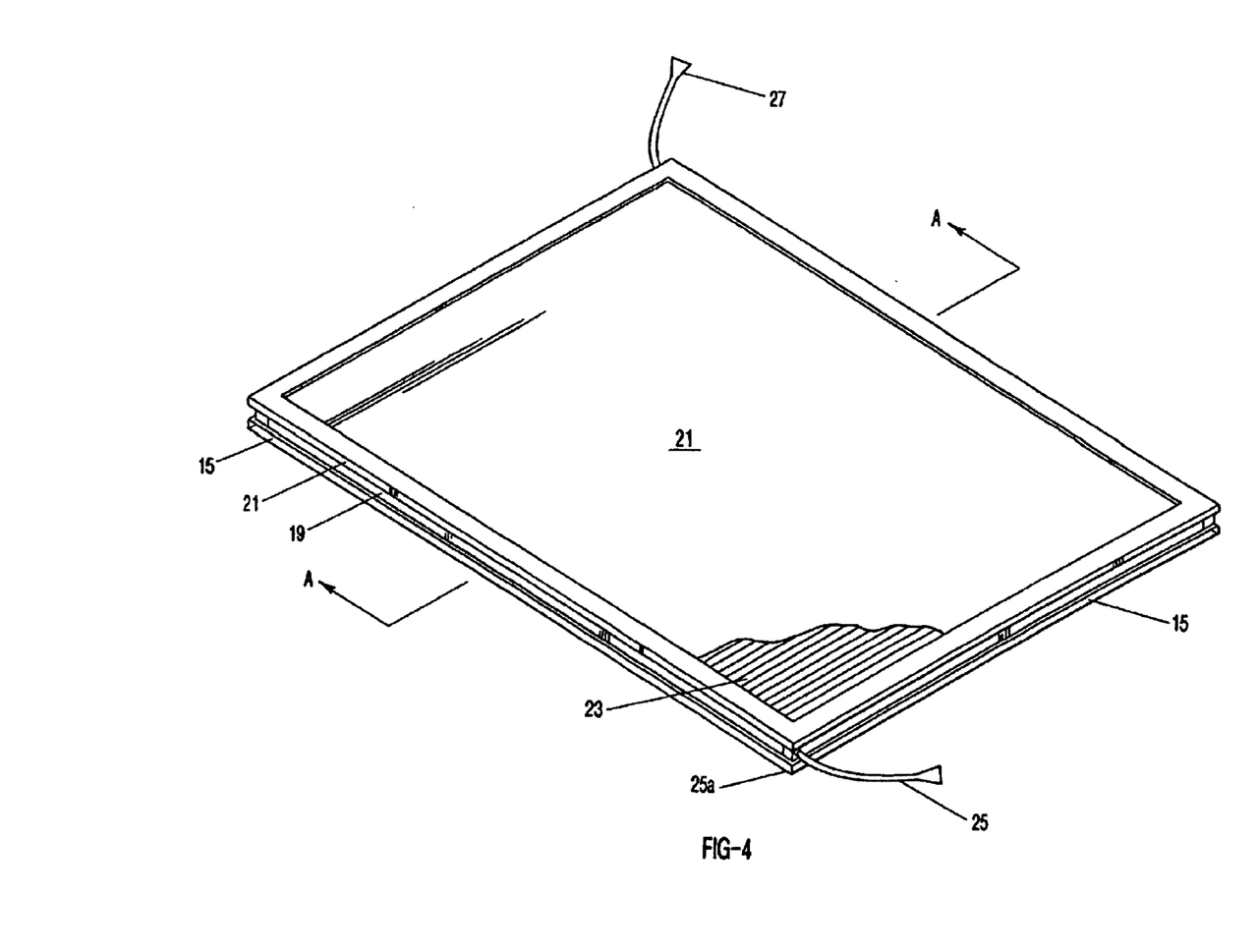
FIG. 4 is a side perspective view of the present invention illustrating the LCD substrate on the bottom coupled to the protective substrate on the top, the coupling producing an air gap or cavity therebetween, as cohesive, or laminating, fluid is initially injected into the air gap, in accordance with the present invention.

As seen in FIG. 4, at least one means for injecting 25 is inserted into and through the means for bonding 17 at a first corner (such as, for example, 25*a* in FIG. 4) of the bonded substrate 31, thereby forming at least one injection port 25*a*. Preferably, the first corner 25*a* is at a bottom (or lower) corner. A preferred means for injecting 25 includes a pressurized means in fluid communication with a syringe in fluid communication with a catheter having a needle or other similar device of equivalent function and size. The means for injecting 25 should be inserted through the means for bonding 17 or otherwise allowed to enter the air gap 19. Then, a means for exhausting 27 is inserted into and through the means for bonding 17 at another corner 27*a* (not shown, but in similar fashion to 25*a*) or another location of the bonded substrate 31, and preferably, the opposite corner of the bonded substrate 31, thereby forming an exhaust port 27. Applying this step severely reduces or completely eliminates the bowing of the bonded substrate due to hydrostatic pressure and allows the means for optically coupling 23 to sweep the two intermediate corners of any air or gas that might otherwise be trapped adjacent to these corners. A preferred means for exhausting 27 includes a catheter having a needle. In this construct, the means for exhausting 27 is in gas-flow communication with the air gap 19. Those of skill in the art will know that the means for injecting 25 and a means for exhausting 27 can be integrally formed with the means for bonding 17 to thereby form a means for bonding, injecting and exhausting (not shown) and still be within the spirit and the scope of the present invention. Further, those of skill in the art will appreciate that the exact design, location and angular placement of the means for injecting 25 and the means for exhausting 27 is not critical other than to allow or assist in the uniform and complete filling of the air gap 19 with the means for optically coupling 23. Thus, in some applications, the placement of the means for injecting 25 and the means for exhausting 27 can be at a predetermined angle from the edge of bonded substrate 31, or can be positioned at adjacent corners.

Then, a means for optically coupling 23 is de-gassed by conventional means (such as, for example, by a vacuum chamber) to rid the means for optically coupling 23 of any gas bubbles. A static helical mixer (like those sold by Liquid Control Corporation or Fluid Research Corporation) could be used to de-gas the means for optically coupling 23, and thus, a de-gassed means for optically coupling could be bought as an off-the-shelf component. To minimize any altering characteristics in applying the means for optically coupling 23 in the bonded substrate 31, the means for optically coupling 23 should have a very low Young's modulus and should behave as fluidic as practical in either stress or strain conditions. In sum, the means for optically coupling 23 should preferably be unable to sustain a shear force in itself, have a refractive index between 1.45 and 1.55 at 555 nm, have an optical transmission of 0.995 min at 0.045 inch thickness and be non-yellowing. Further, due to the substrates typically employed, the means for optically coupling 23 should preferably have a chemical compatibility with triacetylcellulose, acrylic foam and VHB adhesives. One such preferred means for optically coupling 23 includes materials such as Q3-6575 manufactured by Dow Corning or like dielectric material. This material is designed for electronics and other encapsulation methods, having an index of refraction of 1.405, a working temperature range of between −80 to 200 degrees Celsius and has an advertised penetration value of 70, yet does not exhibit a radical viscosity or hardening characteristics over a temperature range present in some other petrochemicals. It is optically clear, does not significantly degrade when exposed to UV wavelength radiation and readily adheres to substrates. While Q3-6575 adequately cures within a relatively short time, it should be allowed up to four hours for a cure that will not flow under the influence of gravity. Other materials that can be used in the present invention as a means for optically coupling 23 include ECOGEL 1265 and 1365 (manufactured by Emerson and Dow Corning), Sylgard 184 (manufactured by Dow Corning), Siloxane Laser Liquid Code 1074 (manufactured by R.P. Cargille Laboratories) Immersion Liquid Code 1160 (manufactured by R.P. Cargille Laboratories), Pennzane cyclopentane oil (manufactured by Pennzoil), OC Fluid DS990813 (manufactured by NYE Lubricants), NYOGEL OCK-451 (manufactured by NYE Lubricants and modified for the present application), and derivatives thereof. A preferred means for optically coupling 23 is an optically clear dielectric gel having a substrate approximately matching index of refraction (e.g., allows light to transmit through instead of reflecting the light) as substrates 11, 21 and able to fully cure in a short amount of time.

The means for optically coupling 23 is then preferably completely de-aired by vacuum degassing after mixing, but prior to injection. The means for optically coupling 23 is introduced through the means for injecting 25 (and hence, through the injection port) and the pressurized means 29 (not shown, but of conventional design) is engaged. Initially, the pressurized means 29 should be set at a low pressure level depending on the size of the substrates 11, 21 (such as below 15 psi, and preferably between 10–12 psi) to allow complete, uniform and smooth dispensation of the means for optically coupling 23 in the air gap 19 volume adjacent to the injection port 25. The means for optically coupling 23, when introduced into the air gap 19, coats all internal surfaces (including the exterior surface of the means for absorbing 41 furthest away from substrate surface 11a) by capillary action. Once the air gap 19 volume begins to fill (from one of the bottom corners of the bonded substrate) due to the pressurized injection of the means for optically coupling 23, the pressurized means 29 can be steadily increased. Preferably, the pressurized means 29 (not shown) can be set as high as 70 psi to allow faster infusion of the means for optically coupling 23 into the air gap 19 as long as the substrates 11, 21 are not damaged by the temporary hydrostatic deflection they will undergo. As those of skill in the art will appreciate, and gas within the air gap 19 will escape steadily through the means for exhausting 27 as the pressurized injection process continues. Prior to completely filling the air gap 19 with the means for optically coupling 23, the pressurized source 29 can be dramatically lowered or disengaged, as the means for optically coupling 23 will continue to dispense into the air gap 19 to completely fill up the air gap volume. The means for optically coupling 23, when fully filling the air gap, should be preferably close to ambient pressure to avoid distending the adjacent substrates 11, 21. As will be realized by those of skill in the art, a wider air gap 19 promotes a faster injection process. Once the means for optically coupling 23 completely fills up the air gap 19, the overall coupled substrate should be allowed to adequately cure (e.g., approximately five to fifteen minutes for minimal cure, and up to three hours for optimum cure). In this fashion, as the means for injecting 25 and the means for exhausting 27 are withdrawn from the bonded substrate, any uncured means for optically coupling 23 will correspondingly fill or complete any air holes that may exist in the means for bonding 17, and thus, allow the bonded substrate to remain hermetically sealed.

Figure 6:
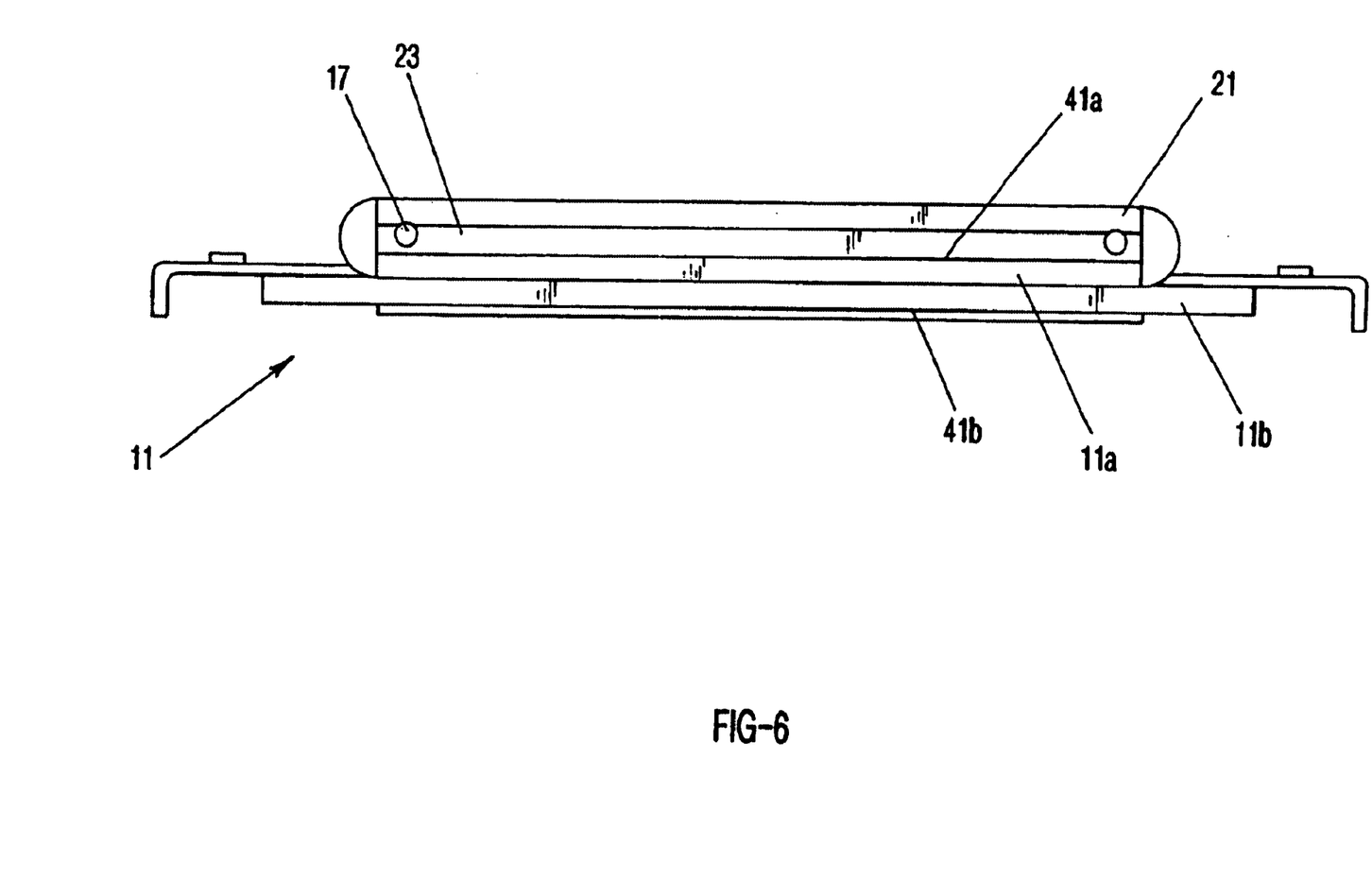
FIG. 6 is an alternate side cross sectional view of the present invention.

One embodiment of the product produced by the method disclosed is illustrated in FIG. 6. As shown, the product includes an active matrix LCD substrate 11 including a passive plate 11a coupled to a active plate 11b, a means for absorbing 41a formed atop the passive plate 11, a protective substrate 21, and an optical means for cohering 23 disposed between the protective substrate 21, the means for absorbing 41a and the means for bonding 17.

Figure 8:
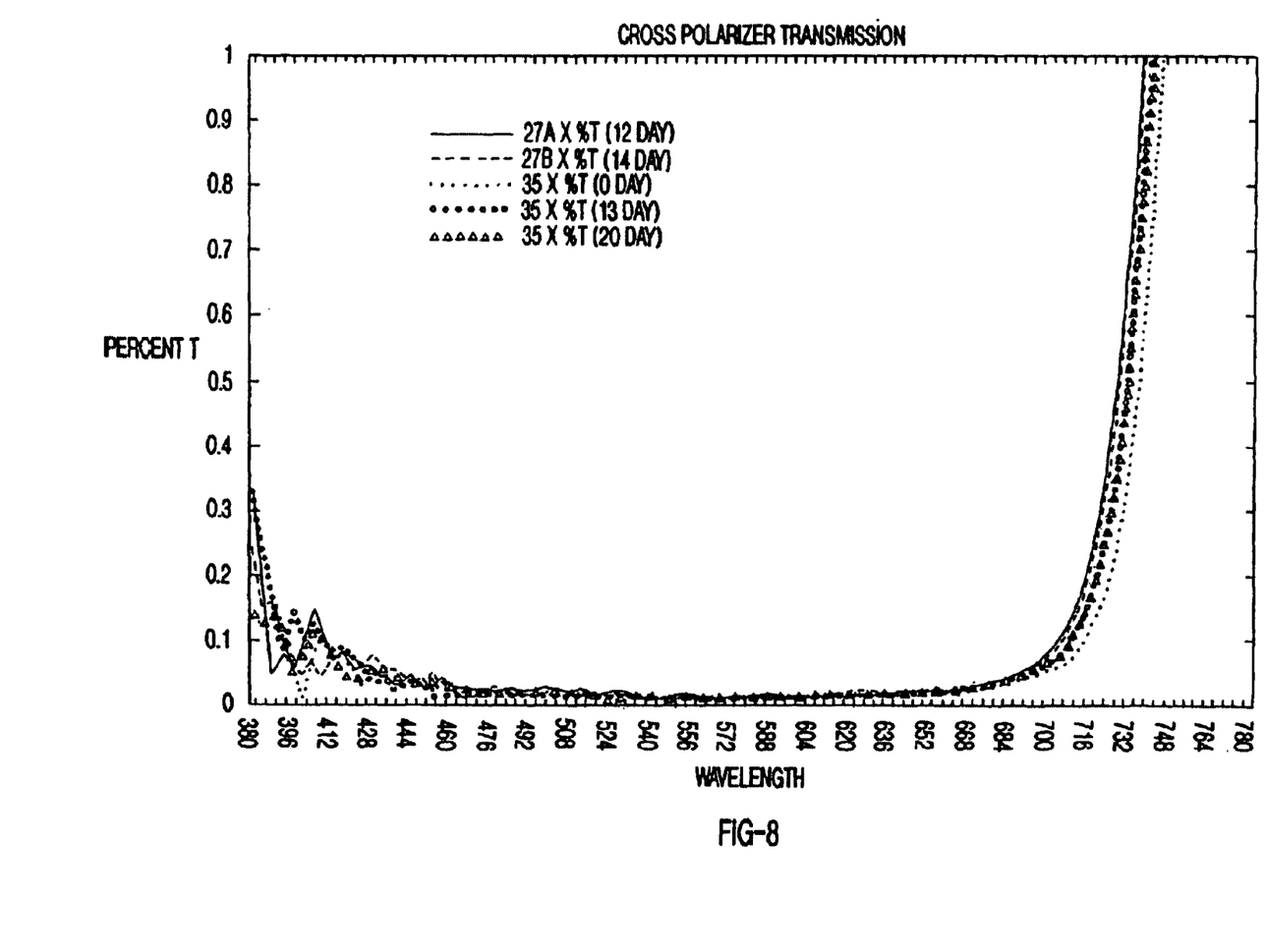
FIG. 8 is a graph illustrating the cross polarizer transmission of the test substrate produced by the method disclosed herein over variable wavelengths (including the visible spectrum) and over a number of days.
Figure 9:
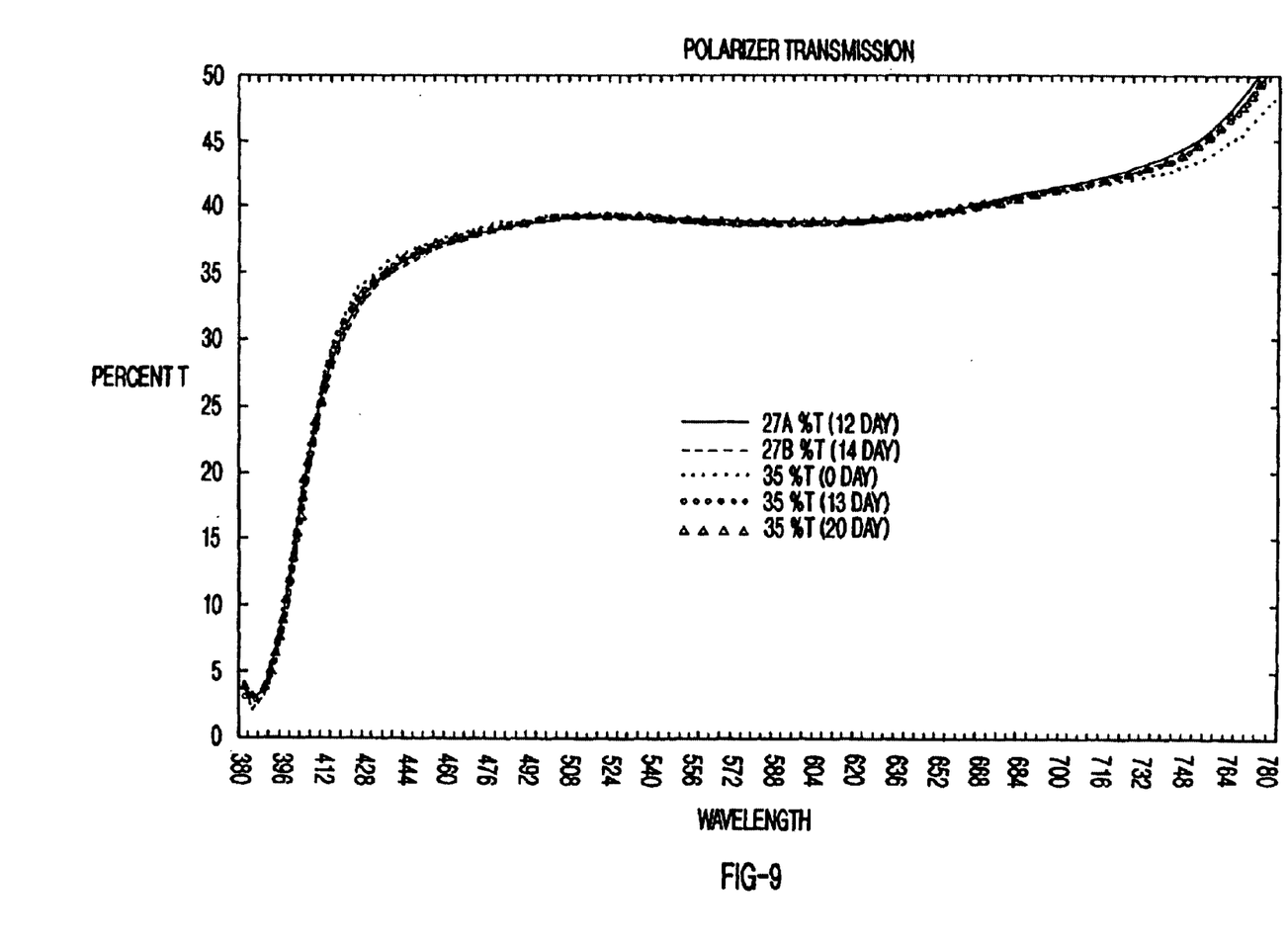
FIG. 9 is a graph illustrating the polarizer transmission of the test substrate produced by the method disclosed herein over variable wavelengths (including the visible spectrum) and over a number of days.
Figure 10:
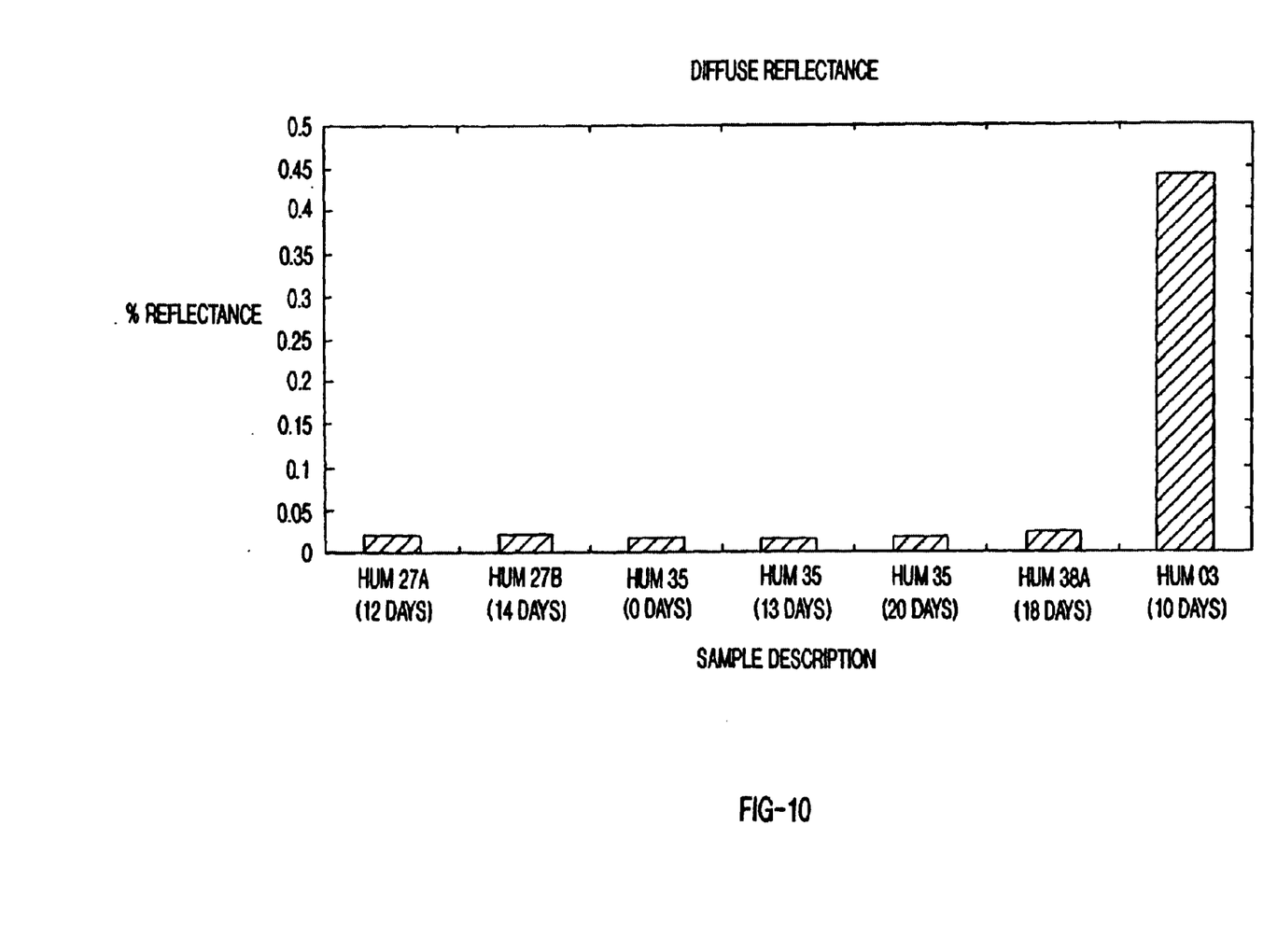
FIG. 10 is a graph illustrating the diffuse reflectance of various bonded test substrates produced by the method disclosed herein over a number of days and demonstrates the improvement in the diffuse reflectance with substrates that incorporate an absorbing material in accordance with the present invention.

The present invention allows for substrates being coupled together by a optical means for cohering so as to significantly decrease or eliminate water or like liquid buildup or condensation between the coupled substrates. Further, the present invention provides a more reliable system for coupling substrates together without any formation of air bubbles or substrate bowl shapes, regardless of the adjacent temperature or environmental conditions. FIGS. 8–10 illustrate the same or different substrates over a number of days which have been subjected to high humidity conditions. These figures illustrate by employing the present method, there is no change in the polarizing or reflectance characteristics of the substrates in the visible wavelengths subjected to high humidity conditions over a number of days.

Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention and are not intended to limit the scope of the invention. It is contemplated that the use of the present invention can involve components having different characteristics as long as the principle, the presentation of a method for using means for absorbing in coupling substrates, is followed.

The embodiments of an invention in which an exclusive property or right is claimed are defined as follows:

1. A method of coupling substrates together and eliminating a formation of condensation between a cell comprising the coupled substrates, the steps comprising:
   applying a moisture absorber upon an inner surface of a first substrate, wherein the first substrate comprises a viewed surface of a liquid crystal display;
   placing a means for bonding adjacent to an outer edge of the first substrate and upon a portion of the moisture absorber;
   forming a bonded substrate and the cell by seating a second substrate to the means for bonding on top of the first substrate, wherein said second substrate comprises a protective surface; and
   introducing an optical coupling gel into the cell.

2. The method of claim 1 wherein the optical coupling gel is a dielectric, optically clear dielectric gel having a matching index of refraction.

3. The method of claim 2 wherein the moisture absorber is a polyvinyl alcohol film.

4. The method of claim 3 wherein the polyvinyl alcohol film a polarized film.

5. A substrate bonded and coupled in accordance with the method of claim 4.

6. The method of claim 1 wherein the means for optically coupling is selected from the group consisting of Dow Corning Q3-6575, ECOGEL 1265, ECOGEL 1365, Sylgard 184, Siloxane Laser Liquid Code 1074, Immersion Liquid Code 1160, Pennzane cyclopentane oil, OC DS990813 and NYOGEL OCK-451.

7. A method of coupling substrates together and eliminating a formation of condensation from a cell formed by the coupled substrates, the steps comprising:

introducing a first substrate comprising a viewed surface of the liquid crystal display;

introducing a second substrate and placing the first substrate adjacent to the second substrate, the second substrate being a moisture absorber;

introducing a third substrate, wherein said third substrate comprises a protective surface;

capturing the second substrate between the first substrate and the third substrate;

forming a seal between the first substrate and the third substrate, the cell being formed between the second substrate and the third substrate on top of the liquid crystal display; and injecting an optical coupler into the cell to couple the second substrate and the third substrate together.

8. The method of claim 7, wherein the third substrate is selected from the group consisting of a glass substrate, an anti-reflective coated substrate and an ITO-coated substrate.

9. The method of claim 7 wherein the means for coupling is a dielectric, optically clear gel having an index of refraction approximately matching that of the second substrate and the third substrate.

10. The method of claim 7 wherein the second substrate is a polyvinyl alcohol film.

11. The method of claim 10 wherein the polyvinyl alcohol film comprises a polarizing film.

12. A bonded substrate produced in accordance with the method of claim 7.

13. An apparatus for elimination of a formation of condensation in a cell of a liquid crystal display, the cell comprising a first and a second optical substrate coupled together and bonded at an outer edge of the first and second optical substrates, the apparatus comprising:

a moisture absorbing film affixed to an inner surface of the first substrate, wherein said first substrate comprises a viewed surface of the liquid crystal display, said second substrate comprises a protective substrate and wherein said cell is formed on top of the liquid crystal display; and an optically coupled gel filling the cell.

14. The apparatus of claim 13 wherein said moisture absorbing film comprises a polyvinyl film.

15. The apparatus of claim 13 wherein said polyvinyl film comprises a polarizing film.

* * * * *